(No Model.)
T. H. BURRIDGE, Dec'd.
T. J. BURRIDGE, Administrator,
SHEAVE OR PULLEY FOR CABLE RAILWAYS.
No. 403,326. Patented May 14, 1889.
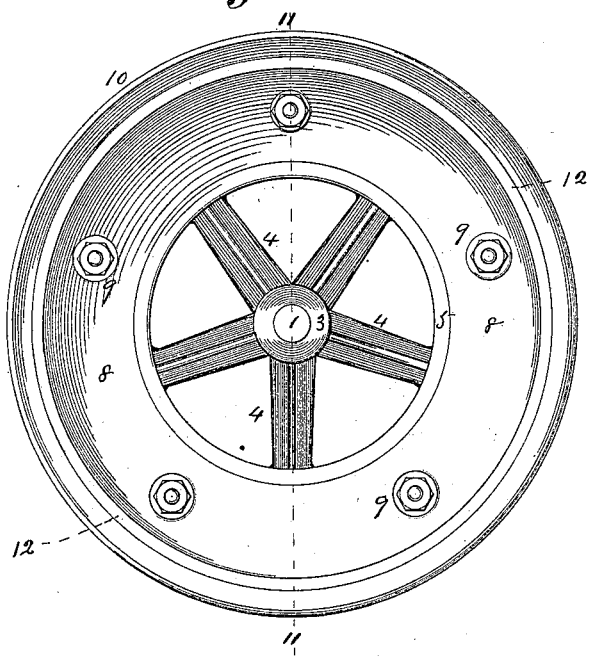
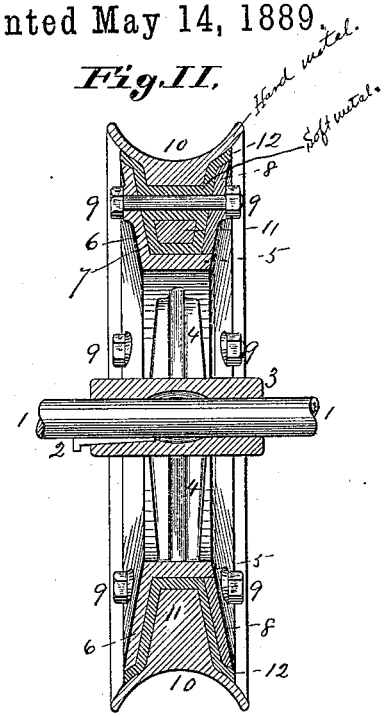
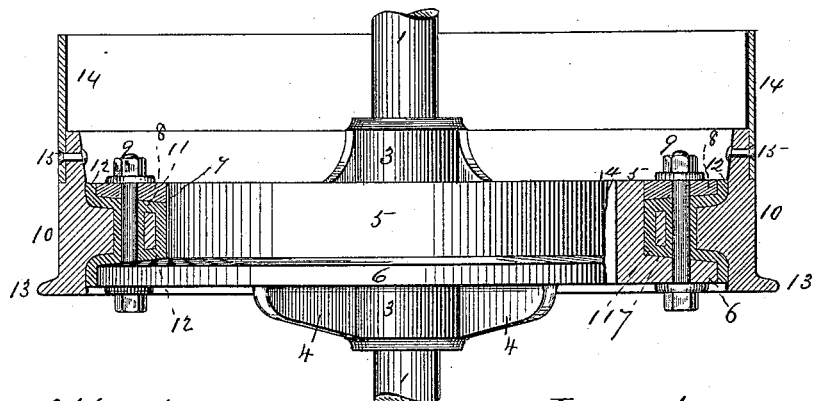
Attest:
Emma Arthur
Geo. L. Wheelock
Inventor:
Thomas H. Burridge
By Knight Bro.
Attys.

UNITED STATES PATENT OFFICE.

THOMAS H. BURRIDGE, OF ST. LOUIS, MISSOURI; THOMAS J. BURRIDGE, OF SAME PLACE, ADMINISTRATOR OF SAID THOMAS H. BURRIDGE, DECEASED.

SHEAVE OR PULLEY FOR CABLE RAILWAYS.

SPECIFICATION forming part of Letters Patent No. 403,326, dated May 14, 1889.

Application filed October 11, 1888. Serial No. 287,789. (No model.)

*To all whom it may concern:*

Be it known that I, THOMAS H. BURRIDGE, of the city of St. Louis, in the State of Missouri, have invented a certain new and useful Improvement in Sheaves or Pulleys for Cable Railways and other Purposes, of which the following is a full, clear, and exact description, reference being had to the accompanying drawings, forming part of this specification.

The improvement consists in forming the face of the sheave or pulley of hard metal (as chilled iron) with soft metal (as lead) underlying it. The purpose is chiefly to prevent (in a great degree) the transmission of noise from the face of the pulley to its body, and at the same time to provide a face which will resist wear and cause a minimum amount of friction on the cable or other thing running against the face of the sheave or pulley.

Figure I is a side view of the sheave or groove-pulley having the improved construction. Fig. II is a section of the sheave at II II, Fig. I. Fig. III is a view, part in section, of a pulley having the improved construction.

The sheave or grooved pulley seen in Figs. I and II is intended to be carried on a horizontal shaft, 1, being fixed thereto by a key, 2, set-screw, or other means, and is shown of proper form to carry the cable of a cable railway.

3 is the hub, 4 the arms or spokes, and 5 is an annular part concentric with the hub, and having at one side a flange, 6, extending outwardly and forming one side of a flaring groove, 7, in which the rim is set. The other side of the groove is formed of a removable flange or ring, 8, of the same form as the flange and fitting at its inner edge the periphery of the part 5. The ring 8 is attached to the flange 6 by bolts 9, passing through both of them and through the groove in a direction parallel with the shaft of the sheave. The body of the sheave may be made of gray iron; but the rim 10 it is preferred to make of white cast-iron cast upon a chill, so as to render it very hard. The rim may be cast in one piece. It has an inner part, 11, so formed as to enter the groove 7, but not to touch the bottom 5 or the sides 6 or 8 of the groove at any part. The bolts 9 pass through the centers of holes in the part 11 of the rim, the holes being of larger diameter than the bolts, so as to leave an annular space around the bolts. This space and the space between the rim and the bottom and sides of the groove 7 are filled with lead or other soft metal or alloy, 12, which will serve to hold the rim in place and to prevent the transmission to a great extent of the vibration in the metal of the rim to the body of the sheave or pulley, and thus prevent the noise produced by the cable upon the sheave or pulley being heard above ground. The outer face of the rim 10 may be of any preferred form. It may be either wider or narrower than the body of the sheave, but must be at least wide enough to take main wear of the cable.

In Fig. III the same improvement is shown applied to the form of pulley used to receive the side pressure of the cable on the convex side of a curve in the railway. The face of the rim 10 in this case is flat, except for a flange, 13, at the lower edge, to prevent the cable running off. The upper part, 14, of the face may be formed of a cylindrical ring, whose lower edge is fitted in a recess in the upper edge of the chilled rim 10 and made fast by rivets 15. The description of the sheave or pulley shown in Figs. I and II in other respects applies to the pulley shown in Fig. III.

I claim—

1. A sheave or pulley having a body formed with a flanged annular part, a rim distinct from the body having an inner part, 11, entering between the flanges, the bolts connecting the flanges, and the soft metal interposed between the rim and inner part and the flanged annular part, substantially as described.

2. A sheave or pulley having a body formed with a flanged annular part, 5 6, and a removable ring, 8, bolts connecting the ring and flange, a rim, 10, distinct from the body and having a part, 11, entering between the flange and ring, and soft metal interposed between the rim and the parts 5 6 8, substantially as described.

THOMAS H. BURRIDGE.

Witnesses:
 SAML. KNIGHT,
 EDW. S. KNIGHT.